(12) United States Patent
Hirukawa

(10) Patent No.: US 9,566,651 B2
(45) Date of Patent: Feb. 14, 2017

(54) REPLACEABLE-BLADE-EDGE CUTTING TOOL AND CUTTING INSERT

(71) Applicant: TUNGALOY CORPORATION, Iwaki-shi, Fukushima (JP)

(72) Inventor: Ryo Hirukawa, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 342 days.

(21) Appl. No.: 14/361,633

(22) PCT Filed: Nov. 29, 2012

(86) PCT No.: PCT/JP2012/080976
§ 371 (c)(1),
(2) Date: May 29, 2014

(87) PCT Pub. No.: WO2013/081065
PCT Pub. Date: Jun. 6, 2013

(65) Prior Publication Data
US 2014/0334889 A1    Nov. 13, 2014

(30) Foreign Application Priority Data
Nov. 30, 2011    (JP) .................................. 2011-261693

(51) Int. Cl.
*B23B 27/10*    (2006.01)
*B23C 5/06*    (2006.01)
(Continued)

(52) U.S. Cl.
CPC ............. *B23C 5/06* (2013.01); *B23B 27/1622* (2013.01); *B23C 5/223* (2013.01);
(Continued)

(58) Field of Classification Search
CPC ............ B23B 27/1644; B23B 27/1614; B23B 27/1651; B23B 27/1622; B23B 27/1677
See application file for complete search history.

(56) References Cited

U.S. PATENT DOCUMENTS 3,280,450 A * 10/1966 Sirola ................. B23B 27/1662
407/104
3,289,272 A * 12/1966 Stier .................... B23B 27/1622
407/101
(Continued)

FOREIGN PATENT DOCUMENTS

EP    0 300 172 A2    1/1989
EP    0 559 965 A1    9/1993
(Continued)

OTHER PUBLICATIONS

International Search Report dated Feb. 12, 2013 issued in PCT counterpart application (No. PCT/JP2012/080976).
(Continued)

*Primary Examiner* — Will Fridie, Jr.
(74) *Attorney, Agent, or Firm* — Womble Carlyle

(57) ABSTRACT

An indexable cutting tool of a lever-lock type applies a clamping force. At a bottom of an insert fixing portion, there is formed a pillar-shaped lever in a state in which one end protrudes from a placement surface of the insert fixing portion. A screw applies a pressing force to the lever between the one end and a portion such that the lever is pressed and inclined with the portion s a fulcrum in the middle of the lever so that the one end applies a clamping force to the cutting insert.

20 Claims, 12 Drawing Sheets

(51) Int. Cl.
  *B23C 5/22* (2006.01)
  *B23B 27/16* (2006.01)
  *B23B 27/00* (2006.01)

(52) U.S. Cl.
  CPC ............. *B23B 2200/0423* (2013.01); *B23B 2200/0457* (2013.01); *B23B 2200/125* (2013.01); *B23B 2200/3618* (2013.01); *B23B 2205/12* (2013.01); *B23C 2210/163* (2013.01); *B23C 2210/503* (2013.01); *Y10T 407/22* (2015.01); *Y10T 407/23* (2015.01)

(56) References Cited

U.S. PATENT DOCUMENTS

| | | | |
|---|---|---|---|
| 4,615,650 A | 10/1986 | Hunt | |
| 6,155,754 A | 12/2000 | Jönsson | |
| 6,158,928 A * | 12/2000 | Hecht | B23B 27/1622 407/102 |
| 6,582,162 B2 * | 6/2003 | Shiraiwa | B23B 27/1662 407/101 |
| 7,431,539 B2 * | 10/2008 | Erickson | B23B 27/1662 407/104 |
| 8,573,900 B1 * | 11/2013 | Hecht | B23B 27/045 407/103 |
| 9,089,910 B2 * | 7/2015 | Hecht | B23C 5/2221 |
| 9,199,313 B2 * | 12/2015 | Saji | B23B 27/1622 |
| 2002/0172568 A1 | 11/2002 | Shiraiwa | |
| 2004/0081521 A1 | 4/2004 | Erickson | |
| 2008/0152441 A1 * | 6/2008 | Andersson | B23B 27/065 407/103 |
| 2009/0196698 A1 | 8/2009 | Noureddine | |

FOREIGN PATENT DOCUMENTS

| | | |
|---|---|---|
| JP | S49-50576 A | 5/1974 |
| JP | 2001-150219 A | 6/2001 |

OTHER PUBLICATIONS

International Preliminary Examination Report (IPRP) dated Jun. 3, 2014 issued in PCT counterpart application (No. PCT/JP2012/080976).

Extended search report dated Jul. 6, 2015 issued in European counterpart application (No. 12852492.3).

* cited by examiner

FIG.8A  FIG.8B

REPLACEABLE-BLADE-EDGE CUTTING TOOL AND CUTTING INSERT

RELATED APPLICATIONS

This is a 371 US National Phase of International Patent Application No. PCT/JP2012/080976 filed 2012 Nov. 29, and published as WO2013/081065A1 on Jun. 6, 2013, which claims priority to JP 2011-261693, filed Nov. 30, 2011. The contents of the aforementioned applications are incorporated by reference in their entirety.

TECHNICAL FIELD

The present invention relates to a cutting tool having a replaceable cutting edge portion i.e., an indexable cutting tool, and a cutting insert which serves as a replaceable cutting edge portion used for the cutting tool, and more particularly to an indexable cutting tool and a cutting insert in which improvements have been made in the shape of a through hole formed through the cutting insert and a clamping mechanism for fixing the cutting insert to a body of the cutting tool.

BACKGROUND ART

Conventional indexable cutting tools use different systems for fixing or clamping a cutting insert depending on uses. For example, for light cutting processing, as used in machining for outside diameter or finishing, in which a cutting insert does not receive a high cutting resistance, a clamping system using an L-shaped lever placed inside a body is used since priority is given to easy replacement of cutting inserts (see, for example, PTL 1). This type of lever generally has a rod-shaped lever body, a clamp portion protruding laterally from one end of the lever body for pressing a cutting insert, and a protrusion provided in the middle of the lever body and protruding outwardly in a radial direction. According to this clamping system, the lever body is accommodated in a hole penetrating a body such that the clamp portion of the lever is positioned in a through hole formed on the cutting insert. In this state, a force is applied to the other end of the lever body so that the lever is inclined, with the protrusion serving as a fulcrum, and the cutting insert is pressed against a side wall of an insert fixing portion (tip seat) of the body, with the clamp portion of the lever serving as a point of action, thereby fixing the cutting insert. On the other hand, for heavy cutting processing or the like with a high cutting resistance, a clamping system using a screw is used to obtain a greater clamping force.

CITATION LIST

Patent Literature

PTL 1: Japanese Patent Laid-Open No. 2004-148496

SUMMARY OF INVENTION

Technical Problem

When the cutting insert is clamped by the clamping system using a lever, there is a case where a sufficient clamping force cannot be obtained. The reason why such a problem occurs is that when the cutting insert is clamped with an L-shaped lever, the distance between a point of effort at the other end of the lever and a fulcrum becomes too long relative to the thickness of the lever, which occasionally leads to the deformation of the lever when force is applied. If the lever is deformed, the force applied to the lever acts on the lever not to be inclined but to be deformed, and thus is not efficiently transmitted to the cutting insert. This problem often occurs particularly in a cutting tool whose body is not large and in which only a lever with a thin body can be used. The problem is particularly prominent in clamping the cutting insert having an acute corner (a corner with an acute angle defined by side surfaces which extend from the ends of the corner), such as a V-shaped cutting insert of the ISO standard, since the distance between a position where the clamp portion abuts on the cutting insert and a position where the cutting insert is pressed against side walls of an insert seat of the body is long.

Another problem of the conventional cutting insert is that shared use of the cutting insert for a cutting tool adopting the clamping system using a lever and for a cutting tool adopting the clamping system using a screw is not taken into consideration. More specifically, the cutting insert conventionally used for the cutting tool adopting the clamping system using a lever cannot be used for the cutting tool adopting the clamping system using a screw. Therefore, two types of cutting inserts having the same size need to be prepared for light cutting processing and heavy cutting processing. This occasionally causes a problem of an increase in management costs.

The present invention has been made to solve the above problems. In other words, it is an object of the present invention to provide a cutting insert that is adaptable to both the clamping system using a lever and the clamping system using a screw, and an indexable cutting tool of a lever type having a greater clamping force than the conventional cutting tool, for which the cutting insert is used.

Solution to Problem

In a first aspect of the present invention, there is provided a cutting insert used for an indexable cutting tool, the cutting insert comprising:

a through hole (26) formed between a first surface (22) and a second surface (25) that are opposite to each other, the through hole (26) having:

a first portion defining a first space adjacent to the first surface (22);

a second portion adjacent to the second surface (25) and defining a second space that is larger than the first space; and a constricted portion (26c) formed between the first portion and the second portion so as to connect the first space to the second space.

In a second aspect of the present invention, there is provided an indexable cutting tool (A) using the cutting insert (2) in a replaceable manner according to claim 1 or 2, the indexable cutting tool (A) comprising:

a body (1) for holding the cutting insert (2);

a lever (3) having the one end (31) applying a clamping force to the cutting insert (2) from the inside of the second portion (26b) of the through hole (26); and a pressing member (4) for pressing the lever (3) and causing the lever (3) to be inclined around a fulcrum on the lever (3) so that the clamping force is applied to the lever (3), wherein the body (1) has an insert fixing portion (11) for placing the cutting insert (2), the insert fixing portion (11) being provided with a placement surface (12) on which the cutting insert (2) is placed and a side wall (11a) formed along the edge of the placement surface (12) and abutting on a side surface (27) of the cutting insert;

wherein the one end (31) of the lever (3) is arranged at a bottom of the insert fixing portion (11) so as to protrude from the placement surface (12) of the insert fixing portion (11) and be accommodated in the second portion (26b); and wherein a position where a pressing force of the pressing member (4) is applied and a position of the fulcrum are defined such that the lever (3) is inclined in a manner that the one end (31) moves forward in a pressing direction by the pressing member (4).

In a third aspect of the present invention, there is provided an indexable cutting tool (A) using a cutting insert (2) in a replaceable manner, the indexable cutting tool (A) comprising:

a body (1) for holding the cutting insert (2);

a lever (3) having one end (31) accommodated in a space provided for the cutting insert (2) and applying a clamping force to the cutting insert (2) from the inside of a portion (26b) defining the space; and a pressing member (4) for pressing the lever (3) and causing the lever (3) to be inclined around a fulcrum on the lever (3) so that the clamping force is applied to the lever (3), wherein the body (1) has an insert fixing portion (11) for placing the cutting insert (2), and the insert fixing portion (11) being provided with a placement surface (12) on which the cutting insert (2) is placed and a side wall (11a) formed along the edge of the placement surface (12) and abutting on a side surface (27) of the cutting insert;

wherein the one end (31) of the lever (3) is arranged at a bottom of the insert fixing portion (11) so as to protrude from the placement surface (12) of the insert fixing portion (11) and be accommodated in the space defined by the portion (26b); and wherein a position where a pressing force of the pressing member (4) is applied and a position of the fulcrum are defined such that the lever (3) is inclined in a manner that the one end (31) moves forward in a pressing direction by the pressing member (4).

Advantageous Effects of Invention

According to the cutting insert (2) of the first aspect of the present invention, since the cutting insert is adaptable to both a cutting tool with the clamping system using a lever and a cutting tool with the clamping system using a screw, management costs can be reduced.

According to the second or third aspect of the present invention, the indexable cutting tool (A) using the cutting insert (2) has the pressing member (4), wherein the position where a pressing force of the pressing member (4) is applied and the position of the fulcrum are defined such that the lever (3) is inclined around the fulcrum on the lever (3) in a manner that the one end (31) which applies a clamping force moves forward in a pressing direction. Accordingly, the pressing force can be applied to the lever (3) at a point close to the one end (31), and the pressing force applied to the lever (3) can be efficiently transmitted to the cutting insert (2) as compared to the conventional structure, thereby increasing a clamping force by the lever (3).

BRIEF DESCRIPTION OF DRAWINGS

FIG. 8A is a side view of the lever of the embodiment of the present invention;

FIG. 8B is a front view of the lever of the embodiment of the present invention;

DESCRIPTION OF EMBODIMENTS

Figure 1:
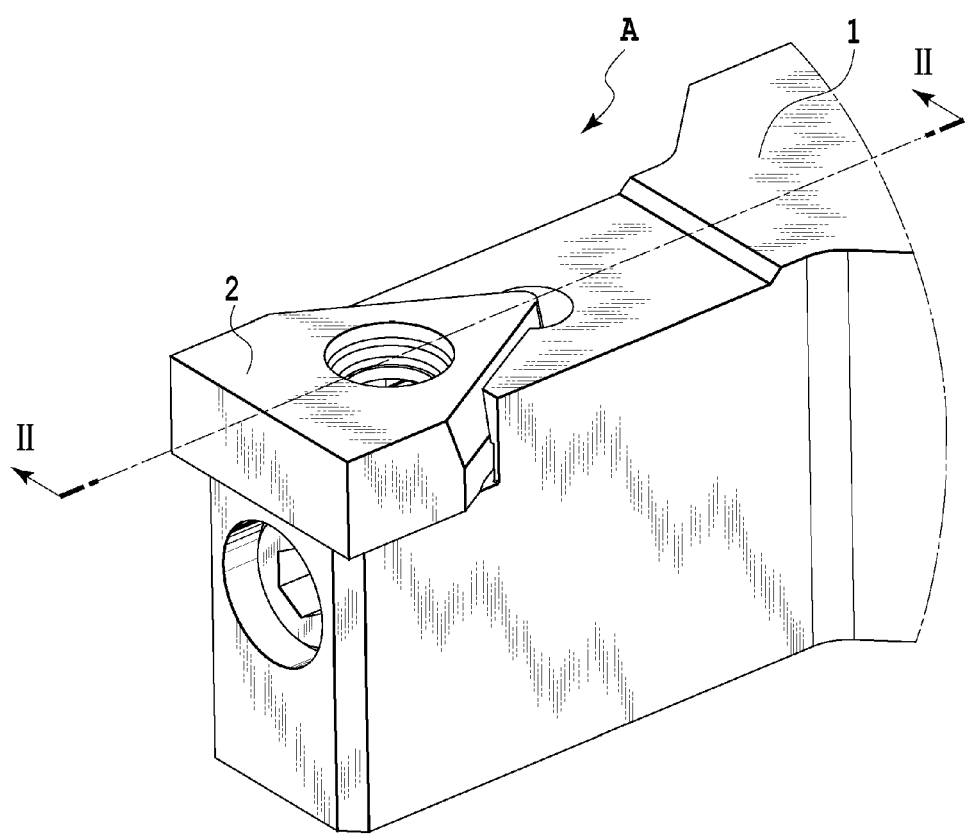
FIG. 1 is an enlarged perspective view of a leading end portion of an indexable cutting tool of an embodiment of the present invention.

With an example of an indexable turning tool for grooving, one embodiment of the present invention will be described with reference to the drawings. It should be noted that the terms indicating directions such as "on/above/over," "below/under," "left," and "right" used in the following description correspond with positional relationships in the drawings. For example, in a figure illustrating an object X above an object Y, this is expressed as "the object X is located above the object Y." The same applies to the left and right. However, these terms only indicate positional relationships in the drawings for explanation, and do not specify the direction in which the cutting insert and the cutting tool are actually used.

(Appearance and Shape of Tool)

Figure 2:
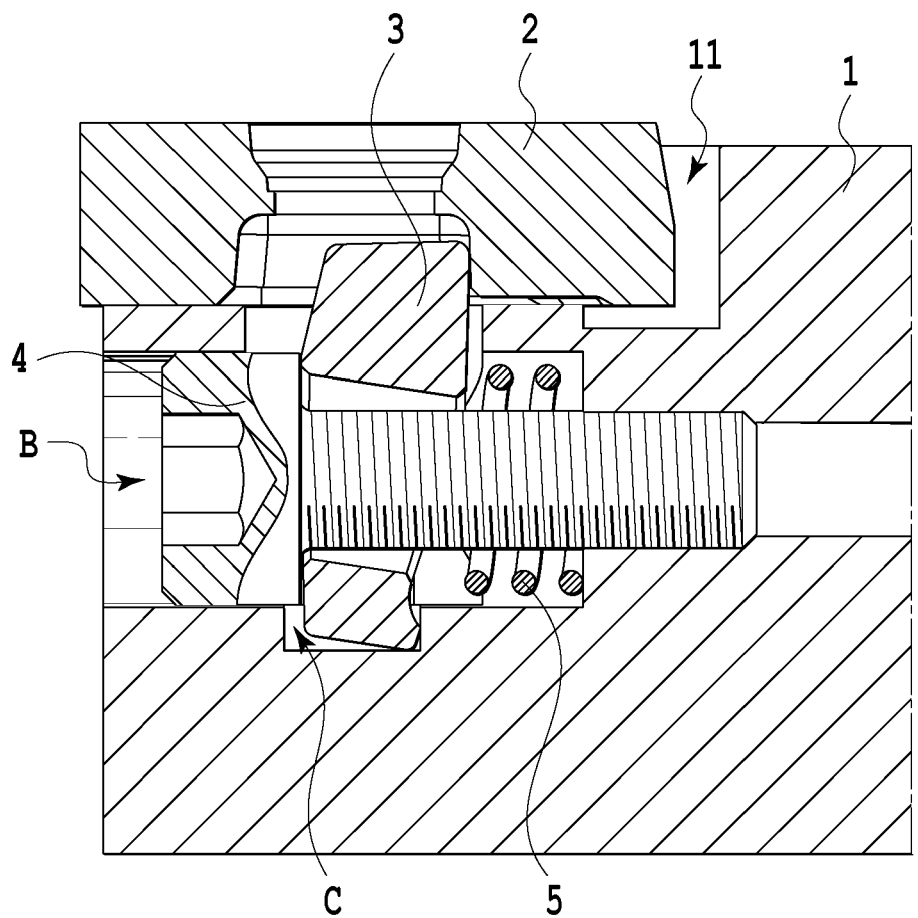
FIG. 2 is a cross-sectional view taken along line II-II of FIG. 1.
Figure 3A:
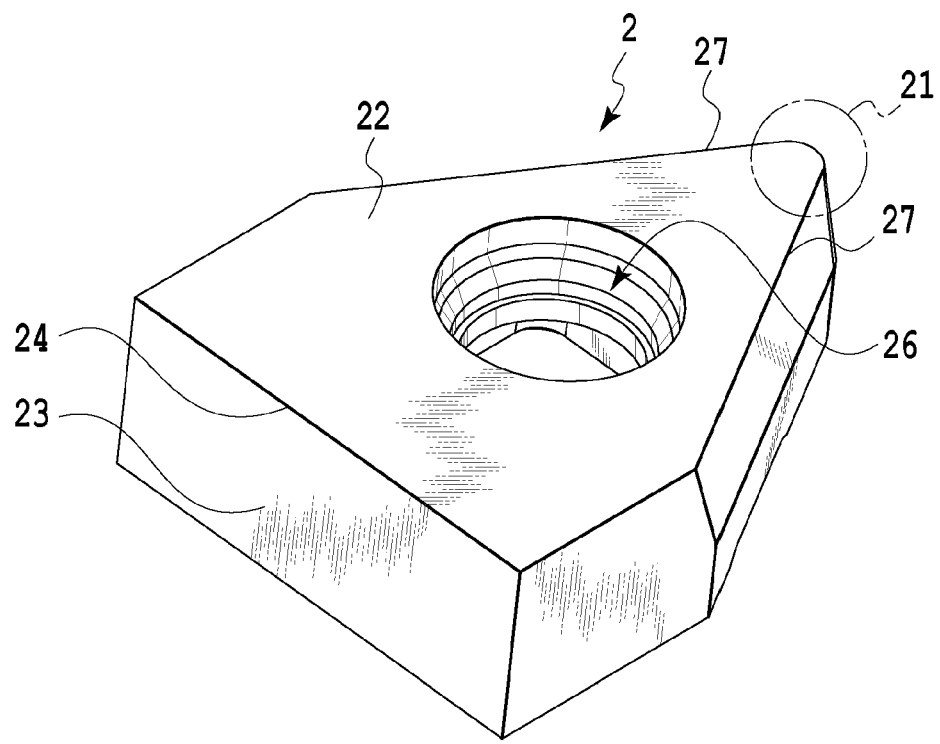
FIG. 3A is a perspective view of a cutting insert of the embodiment of the present invention as viewed from the top.
Figure 3B:
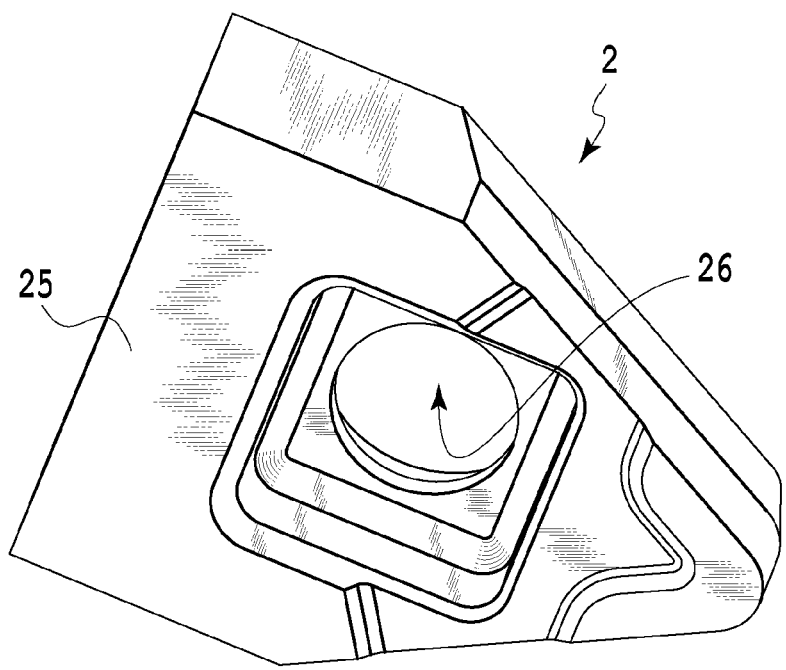
FIG. 3B is a perspective view of the cutting insert of the embodiment of the present invention as viewed from the bottom.
Figure 4:
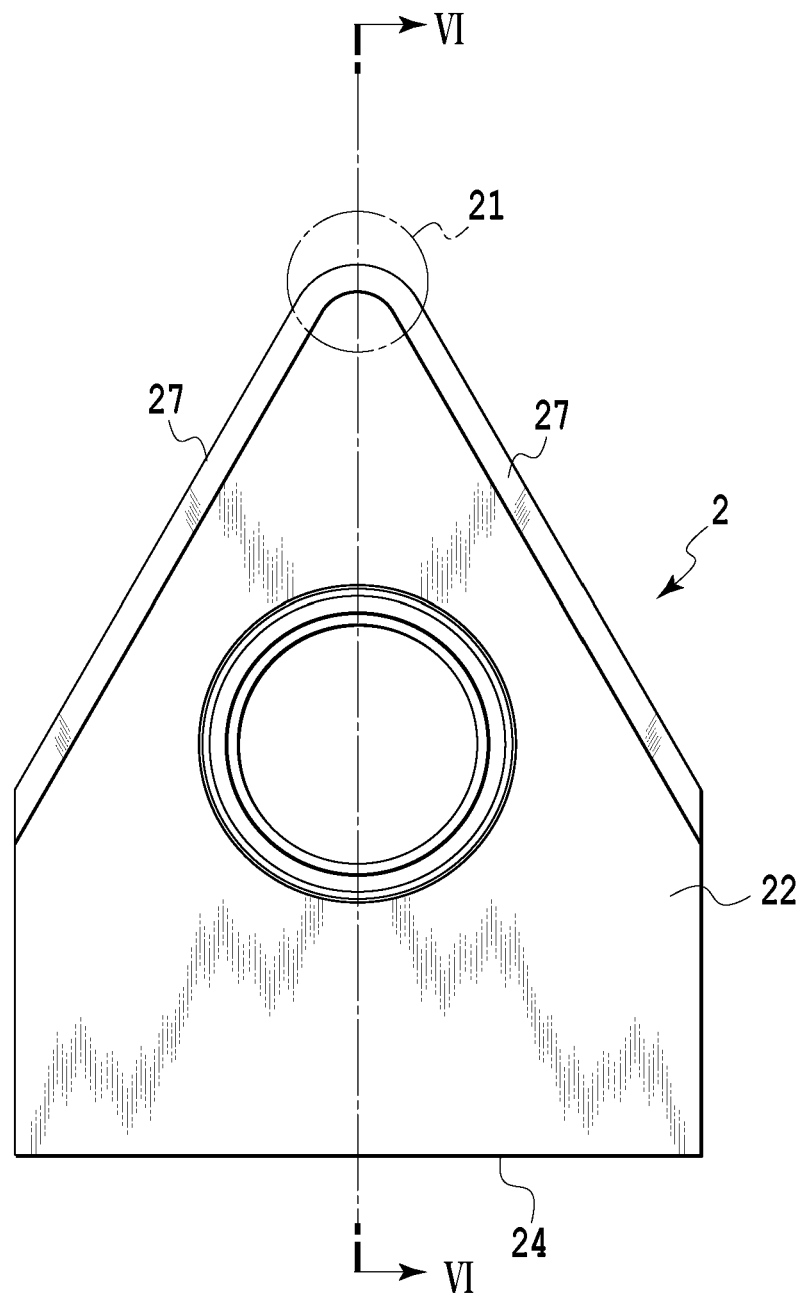
FIG. 4 is a top view of the cutting insert of the embodiment of the present invention.
Figure 5:
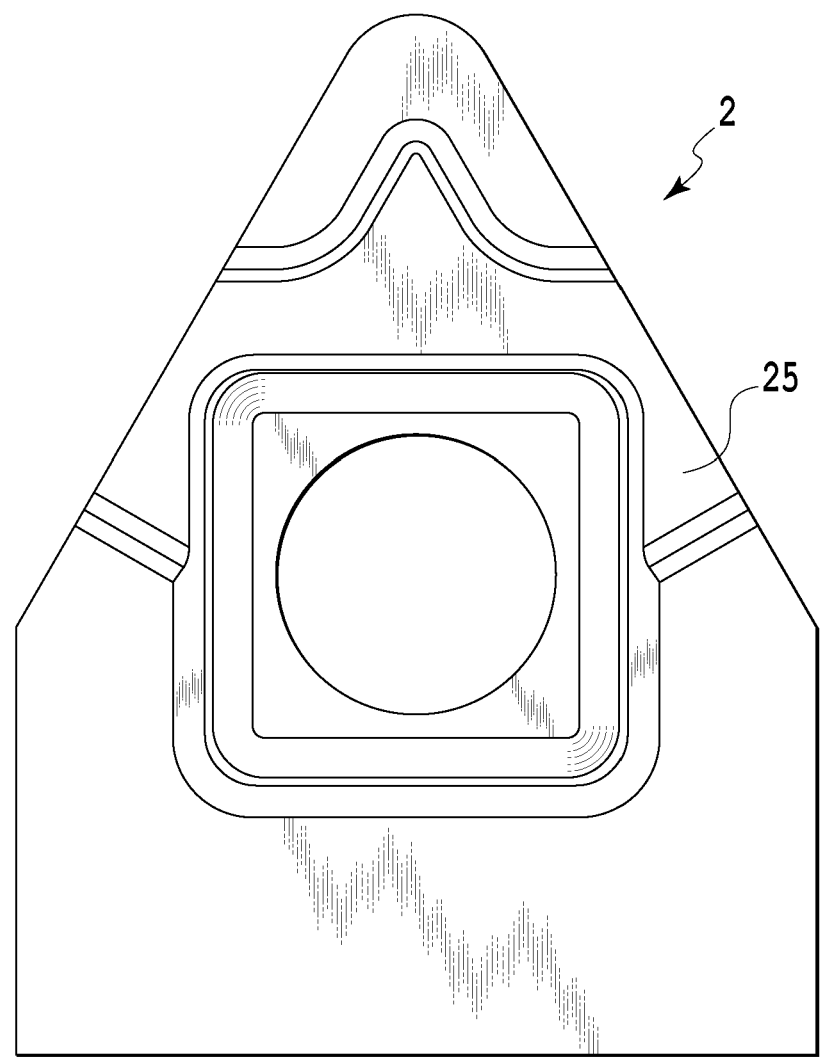
FIG. 5 is a bottom view of the cutting insert of the embodiment of the present invention.

FIG. 1 and FIG. 2 show an indexable cutting tool of the present embodiment. As shown in FIG. 1 and FIG. 2, the indexable cutting tool A of the present invention has a body 1, a lever 3 for clamping a cutting insert 2, a screw 4 that is a pressing member for pressing the lever 3 to be inclined, and a spring 5. In FIG. 2, the left-side portion shows the leading end of the indexable cutting tool A, and the right-side portion shows the rear end of the indexable cutting tool A. A tip of the body 1 is partly cut out in a shape similar to the shape of the cutting insert 2 so that an insert fixing portion 11 is formed on which the cutting insert 2 is placed. As shown in FIG. 2, below the insert fixing portion 11 is formed a space B, in which the lever 3, the screw 4, and the spring 5 are arranged. In the space B, the spring 5 and the lever 3 are arranged in the order from the rear end of the body 1 (right side of FIG. 2), and further the screw 4 is arranged so as to penetrate the spring 5 and the lever 3.

A space C in which the lever 3 is arranged is formed vertically across the space B in the middle of the space B. The size of the space C is larger than the size of the lever 3. This allows the lever 3 to be inclined in the space C when a head of the screw 4 presses the lever 3 as shown in FIG. 2. The space C is in communication with the insert fixing portion 11. A top end portion of the lever 3 arranged in the space C protrudes from a placement surface 12 (see FIG. 9) of the insert fixing portion 11.

The spring 5 biases to the lever 3 toward the tip of the body 1, and has the function of returning the position of the inclined lever 3 to an initial state (described later) when the engagement of the head of the screw 4 with the lever 3 is released.

(Shape of Cutting Insert)

The cutting insert of the present embodiment is substantially pentagonal in shape and has a pair of side surfaces that are adjacent to each other at an acute angle, a pair of opposite side surfaces that are opposite to each other in parallel and extend from the pair of side surfaces at obtuse angles in respective opposite sides of the acute portion, and a side surface formed to be square to the opposite side surfaces. In other words, when viewed from the top, the cutting insert 2 of the present embodiment is substantially a pentagon that is similar to the shape of a home plate in baseball. As shown in FIG. 1, FIG. 3A, FIG. 3B, and FIG. 4, when the cutting insert 2 is viewed from the top, two ridge portions 27 of the cutting insert 2 located at the rear end of the indexable cutting tool A define an acute angle and are smoothly connected to each other via a curved portion 21 (hereinafter referred to as "an acute corner portion"). A cutting edge 24 is formed on an intersecting ridge portion between a top surface 22 of the cutting insert 2 and the side surface 23 to be positioned at the leading end of the indexable cutting tool A.

Figure 6:
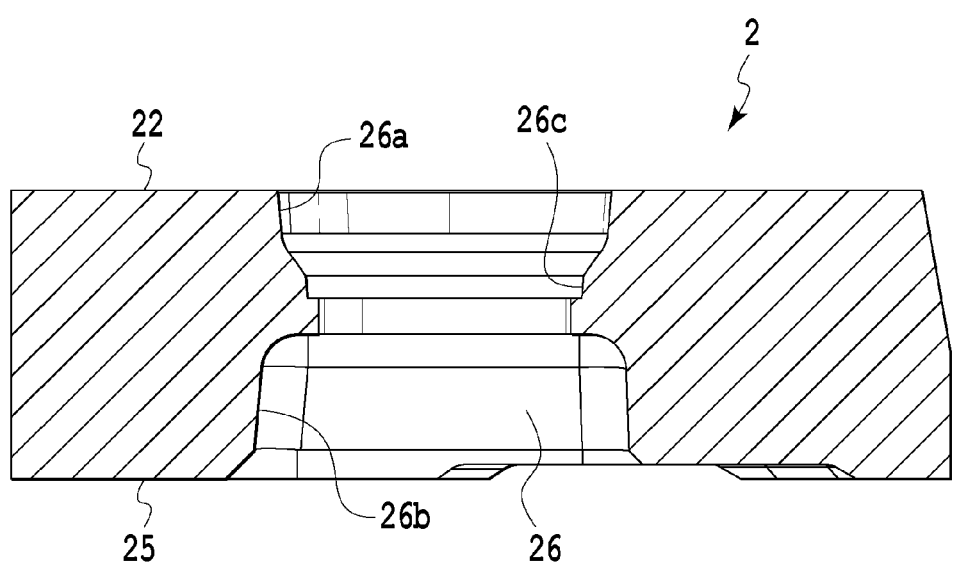
FIG. 6 is a cross-sectional view taken along line VI-VI of FIG. 4.

As shown in FIG. 3A, FIG. 3B, and FIG. 4 to FIG. 6, the cutting insert 2 has a through hole 26 that penetrates from the top surface 22 to a bottom surface 25. As will be described later with reference to FIG. 12, in the case of the indexable cutting tool A with a clamping system using a screw, the through hole 26 allows a screw to be inserted into a screw receiving portion formed on the placement surface 12. As shown in FIG. 6, the through hole 26 of the present embodiment has a minor diameter portion 26a which is a first portion formed adjacent to the top surface 22, a major diameter portion 26b which is a second portion formed adjacent to the bottom surface 25, and a constricted portion 26c which is a space connecting the space defining the minor diameter portion 26a to the space defining the major diameter portion 26b. The diameter of the major diameter portion 26b is larger than the diameter of the minor diameter portion 26a. Accordingly, the major diameter portion 26b defines a space that is larger than the space defined by the minor diameter portion 26a, and in the through hole 26, an inner wall defining the major diameter portion 26b is located farthest from the central axis of the through hole 26. The major diameter portion 26b is a portion in which a top end portion of the lever 3 is accommodated when the cutting insert 2 is placed on the insert fixing portion 11, and the cutting insert 2 is fixed when the top end portion of the lever 3 presses the inner wall of the major diameter portion 26b. The minor diameter portion 26a is a portion in which a screw head is accommodated when the cutting insert 2 is used for a cutting tool with a clamping system using a screw. The constricted portion 26c is a portion which abuts on the screw head inserted into the through hole 26 when the cutting insert 2 is used for a cutting tool with a clamping system using a screw, so that the cutting insert 2 is pressed against the placement surface 12 of the insert fixing portion.

(Shape of Lever)

As shown in FIG. 7A, FIG. 7B, and FIG. 8A to FIG. 8C, the lever 3 is a rod-shaped member being substantially square pillar, and generally has a top end portion 31 protruding from the placement surface 12, a body portion 32 formed under the top end portion 31, and a bottom end portion 33 formed under the body portion 32.

A back surface 32a of the body portion 32 facing the leading end of the body 1 includes a back lower portion 32a1 that is inclined from a portion connected to the bottom surface toward the left side of FIG. 8A and a back upper portion 32a2 that is connected to the back lower portion 32a1 and is inclined from the connecting portion 32a3 toward the right side of FIG. 8A with respect to the bottom surface of the bottom end portion 33 in terms of an angle. More specifically, an angle $\alpha$ defined by the back lower portion 32a1 and the bottom surface of the bottom end portion 33 is obtuse. Since the angle $\alpha$ is obtuse, the center of gravity of the lever 3 becomes closer to the back surface 32a, and the lever 3 can easily return to an initial non-inclined state when the screw 4 is loosened.

The connecting portion 32a3 between the back lower portion 32a1 and the back upper portion 32a2 is located closest to the leading end when the lever 3 is arranged in the body 1. The screw 4 presses the connecting portion 32a3 so that the lever 3 is inclined from the initial state.

A front surface 32b of the body portion 32 facing the rear end of the body 1, or located opposite to the back surface 32a, includes a front lower portion that is inclined from a portion 32b3 connected to the bottom surface toward the right side of FIG. 8A and a front upper portion 32b2 that is connected to the front lower portion 32b1 and is inclined from the connecting portion 32b3 toward the left side of FIG. 8A with respect to the bottom surface of the bottom end portion 33 in terms of an angle. More specifically, an angle $\beta$ defined by the front lower portion 32b1 and the front upper portion 32b2 is obtuse. Since the angle $\beta$ between the front lower portion 32b1 and the front upper portion 32b2 is obtuse and the connecting portion 32b3 therebetween is located closer to the rear end of the body 1 than a portion of the top end portion 31 of the lever 3 which abuts on the inner wall of the major diameter portion 26b of the through hole 26, the fulcrum becomes closer to the rear end of the body 1 than the point of action, and when force is applied to the lever 3 to be inclined as screwing the screw 4 (described later), the top end portion 31 of the lever 3 applies a lateral downward force to the cutting insert 2. Accordingly, the cutting insert 2 receives not only force pressing the side wall but also force pressing the placement surface 12.

A connecting portion 34 between the body portion 32 and the bottom end portion 33 is recessed, which allows the lever 3, when inclined, to avoid being in contact with a step portion 6 (described later).

Figure 7A:
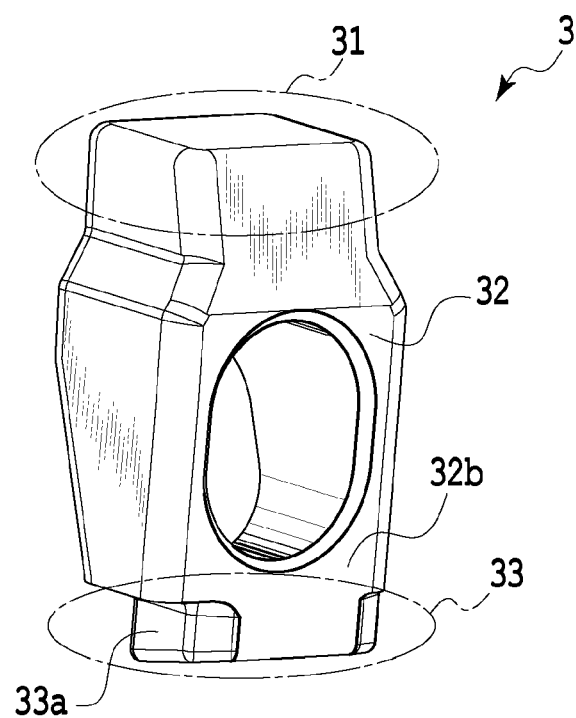
FIG. 7A is a perspective view of a lever of the embodiment of the present invention.
Figure 7B:
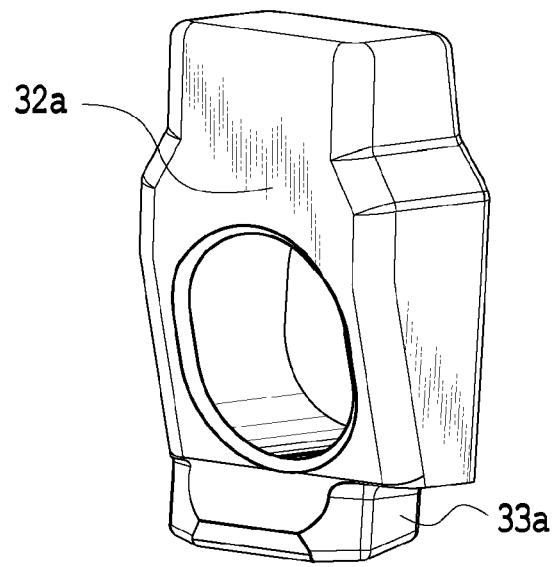
FIG. 7B is a perspective view of the lever of the embodiment of the present invention as viewed from the opposite side of FIG. 7A.
Figure 8C:
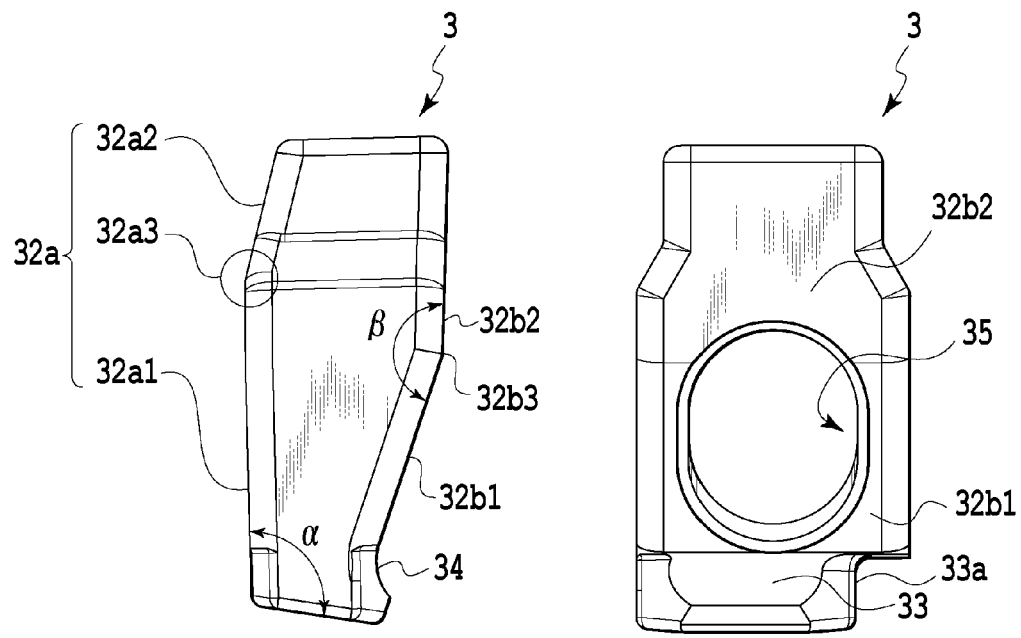
FIG. 8C is a bottom view of the lever of the embodiment of the present invention.
Figure 8C:
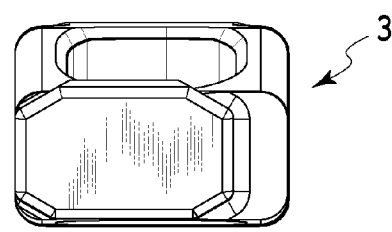
Figure 9:
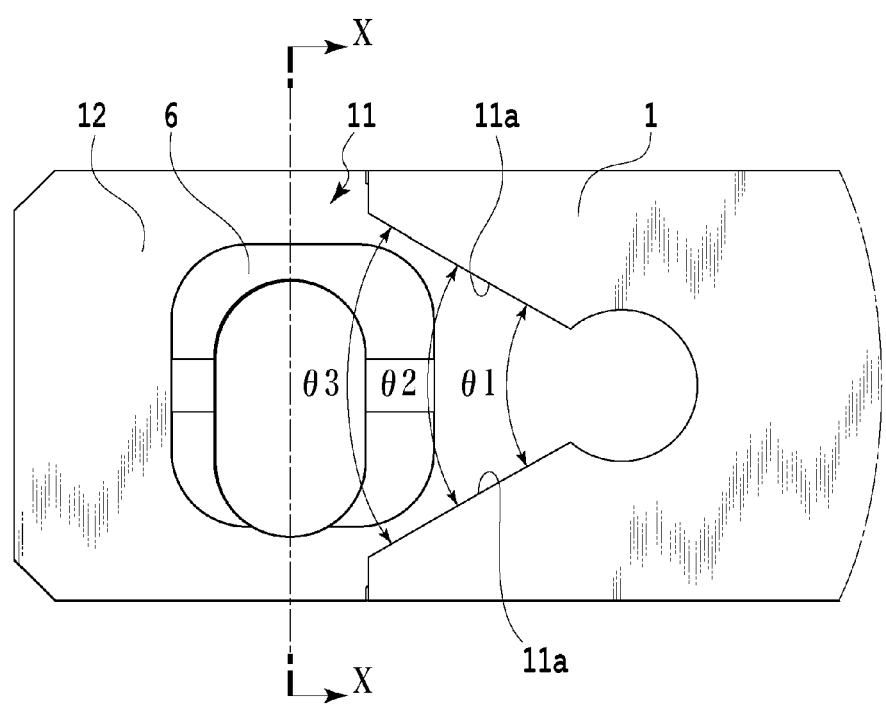
FIG. 9 is an enlarged view of an insert fixing portion of the embodiment of the present invention.
Figure 10:
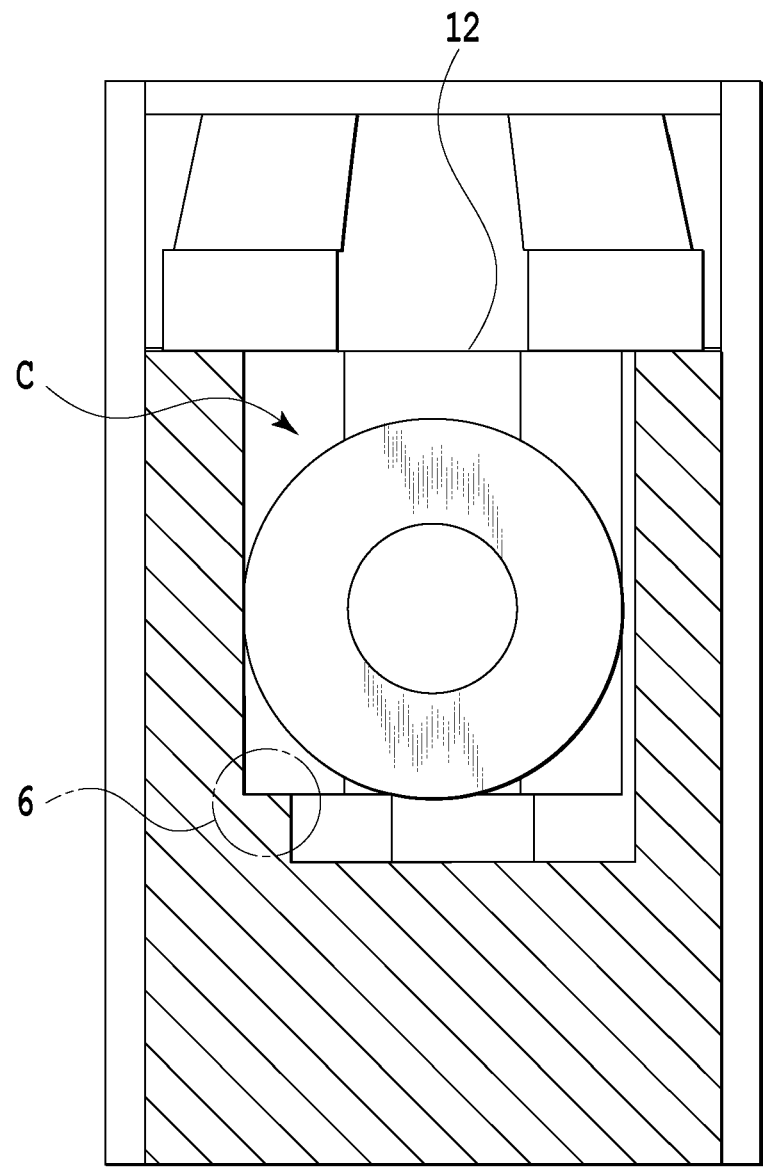
FIG. 10 is cross-sectional view taken along line X-X of FIG. 9.

As shown in FIG. 7A, FIG. 7B, and FIG. 8B, a portion of the bottom end portion 33 is cut out, and thus the bottom end portion 33 is smaller than the body portion 32. In the present embodiment, a cutting-out portion 33a is formed on the right side of the bottom end portion 33 in FIG. 7B and FIG. 8B (left side in FIG. 7A). The cutting-out portion 33a engages the step portion 6 formed at a bottom of the space C formed in the body as shown in FIG. 9 and FIG. 10. The step portion 6 is not formed all around the periphery of the bottom of the space C, but is formed partly. At a portion in which the step portion 6 is not formed, the bottom surface of the space C is directly connected to the side wall. This shape allows the bottom end portion 33 and the step portion 6 to be in contact with each other, and the lever 3 is not accommodated in the space C accordingly unless the front surface 32b of the lever 3 faces the rear end of the body 1. Accordingly, it is possible to prevent the lever 3 from being arranged in the space C in a state in which the front surface 32b of the body portion 32 is not facing the leading end of the body 1.

In the lever 3, there is formed a screw insertion hole 35 penetrating from the front surface 32b to the back surface 32a of the body portion 32. After the lever 3 is arranged in the space C, the screw 4 is inserted into the screw insertion hole 35. As shown in FIG. 7A and FIG. 7B, the screw insertion hole 35 has a width corresponding to the outside diameter of the screw 4 in a lateral direction, and is oval in shape with a height that is longer than the width in a longitudinal direction. This shape suppresses lateral movement of the screw 4 and allows the screw 4 to move back-and-forth smoothly.

(Shape of Insert Fixing Portion)

Figure 11:
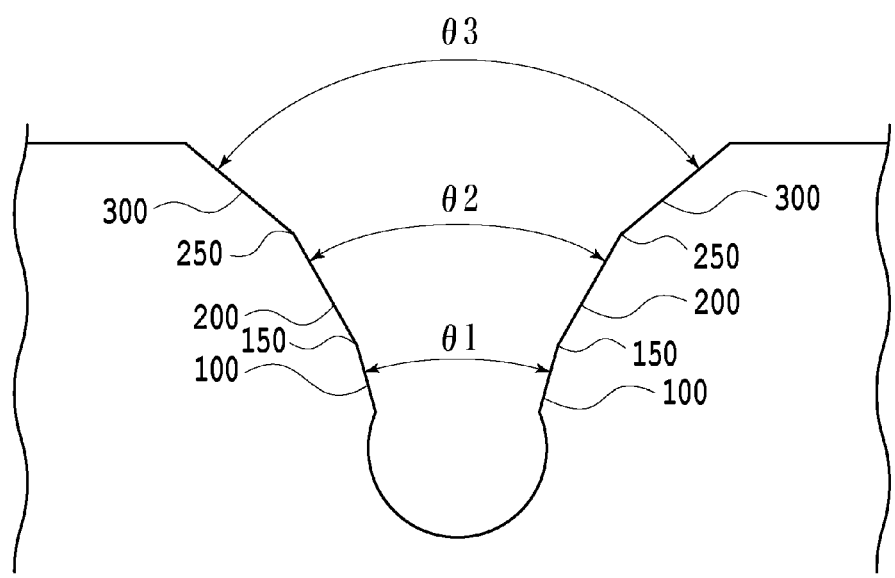
FIG. 11 is a schematic top view showing the shape of a side wall of the insert fixing portion.

FIG. 9 is an enlarged view of the insert fixing portion. As shown in FIG. 9, in the insert fixing portion 11, a pair of side walls 11a is formed so as to sandwich the ridge portions 27 connected to the acute corner portion 21 when the cutting insert 2 is placed. Actually, an angle defined by the side walls of the insert fixing portion is not constant as shown in FIG. 9, but becomes gradually smaller from the leading end portion of the body 1. More specifically, as shown in FIG. 11 which is a schematic top view of the insert fixing portion, an angle defined by a pair of third side wall areas 300 located closest to the leading end portion is denoted by θ3, an angle defined by a pair of second side wall areas 200 that is connected to the pair of third side wall areas 300 is denoted by θ2, and an angle defined by a pair of first side wall areas 100 that is connected to the pair of second side wall areas 200 is denoted by θ1. In this case, the angles satisfy the following relation: θ3>θ2>θ1. The angle θ1 and the angle θ2 are smaller than the angle at the acute corner portion 21 of the cutting insert 2, whereas the angle θ3 is larger than the angle at the acute corner portion 21 of the cutting insert 2. When the angle at the corner of the cutting insert 2 is denoted by γ, it is preferable that θ1=γ−1.5°, θ2=γ−0.5°, and θ3=γ+0.5°. Each of the side surfaces connected to the ridge portions 27 of the cutting insert 2 abuts on a point of a connecting portion 250 between the second side wall area 200 and the third side wall area 300.

(Clamping/Unclamping of Cutting Insert)

Next, the process of clamping the cutting insert will be described. When the screw 4 is loosened and the body portion 32 of the lever 3 is not in contact with the head of the screw 4, the lever 3 is in an initial non-inclined state by a biasing force of the spring 5 in a coil spring form. At the same time, the top end portion 31 of the lever 3 is not in contact with or simply in contact with the inner wall defining the major diameter portion 26b of the through hole 26 of the cutting insert 2, and the lever 3 does not apply force to the cutting insert 2.

As screwing the screw 4, the head of the screw 4 applies force to the body portion 32 of the lever 3. The lever 3 which has received the pressing force from the screw 4 is inclined about a fulcrum, that is, the connecting portion 32b3 of the front surface 32b of the lever body portion that abuts on the inner wall of the body 1 facing the space C, and the top end portion 31 tends to move toward the rear end portion of the body 1, that is, forward in a pressing direction by the head of the screw 4. Accordingly, the top end portion 31 applies force to the inner wall defining the major diameter portion 26b of the through hole 26 so as to press the cutting insert 2 against the side wall 11a of the insert fixing portion 11. At the same time, contact portions of the cutting insert 2 and the side wall 11a of the insert fixing portion 11 is elastically deformed, and accordingly the cutting 2 comes in surface contact or in line contact with the side wall 11a. When the screw 4 is loosened, with retracting of the screw 4, the spring 5 applies force to the lever 3 toward the leading end of the body 1 so as to return the position of the lever 3 to the initial state, thereby unclamping the cutting insert 2.

An advantageous effect of the present embodiment is that the force pressing the lever 3 is efficiently transmitted to the cutting insert 2, and a greater clamping force is obtained as compared to the conventional clamping system using a lever. In the case of the indexable cutting tool A of the present embodiment, the distance between a point where the head of the spring 4 applies force to the lever 3 to be inclined (point of effort) and a fulcrum, that is, the connecting portion 32b3 between the front upper portion and the front lower portion, is very small as compared to the case of using the conventional L-shaped lever. Thus, it is possible to avoid deformation of the lever 3 in clamping. Accordingly, the force applied to the lever 3 is efficiently transmitted to the cutting insert 2, and the cutting insert 2 is reliably clamped with only the small movement of the screw 4. Therefore, the indexable cutting tool A of the present embodiment functions effectively when clamping the cutting insert having a long length from the center of the through hole to the corner, such as a V-shaped cutting insert.

The shape of the side wall 11a of the insert fixing portion 11 contributes to the enhancement of the clamping force. In the conventional indexable cutting tools, generally an angle defined by side walls is constant, and the side walls are formed such that the angle defined by the side walls is larger than the angle at the acute corner of the cutting insert 2. However, the indexable cutting tool (A) of the present embodiment is configured such that the angle defined by the pair of side walls 11a gradually changes as shown in FIG. 11, so that a point where the cutting insert 2 is in contact with or separates from the side walls 11a is shifted toward the rear end of the body 1.

In the case of an indexable cutting tool having a conventional side wall structure, a cutting resistance (particularly thrust force) repeatedly applied to the cutting insert causes an angle (angle of divergence) between the side walls to increase gradually, and the side walls are occasionally separated from the cutting insert. This increases backlash of the cutting insert, and stable processing becomes impossible. At worst, the cutting insert or body may be damaged. In contrast, in the case of the indexable cutting tool of the present embodiment, the side surface connected to the ridge portion 27 of the cutting insert 2 abuts on the connecting portion 250 between the third side wall areas 300 which define the angle of divergence that is larger than the angle at the acute corner and the second side wall areas 200 which define the angle of divergence that is smaller than the angle at the acute corner. Accordingly, although the cutting resistance applied to the cutting insert 2 causes elastic deformation of the second side wall areas 200 starting from the connecting portion 250, the cutting insert 2 and the side wall 11a are kept in contact with each other since the second side wall areas 200 have the angle of divergence that is smaller than the angle at the acute corner. Meanwhile, even if the angle of divergence between the second side wall areas 200 becomes larger than the angle at the acute corner due to the repeating application of cutting resistance (particularly thrust force) to the cutting insert 2, the side surfaces connected to the ridge portions 27 of the cutting insert 2 abut on connecting portions 150 (see FIG. 11) between the second side wall areas 200 and the first side wall areas 100. This allows clamp performance to be maintained for a longer period of time than that of a conventional example. Note that the side wall structure of the present embodiment functions effectively particularly when the angle θ1 is acute, particularly, 60° or smaller.

(Application to Cutting Tool with Clamping System Using Screw)

Figure 12:
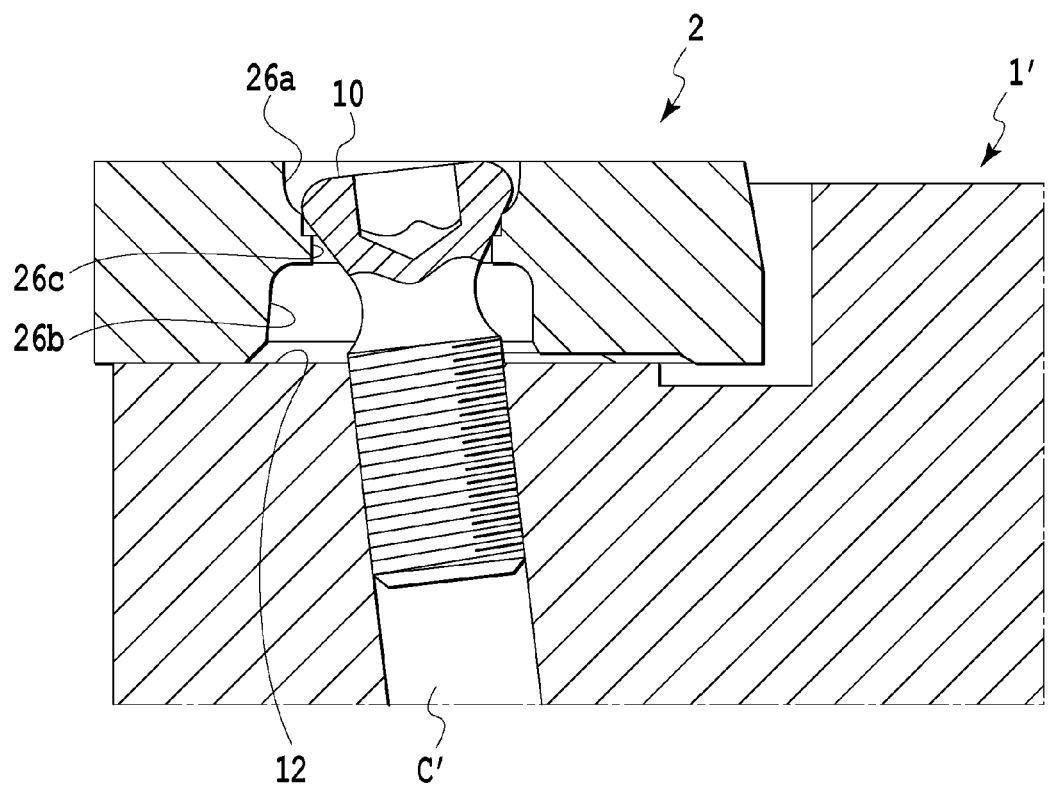
FIG. 12 is an enlarged cross-sectional view showing the state in which the cutting insert of the embodiment of the present invention is clamped by a screw.

The cutting insert 2 of the present embodiment is adaptable not only to the cutting tool adopting a clamping system using a lever as described above, but also to a cutting tool adopting a clamping system using a screw. FIG. 12 is a cross-sectional view of the cutting insert 2 of the present embodiment that is clamped to a body 1' by using a screw 10. In the cutting tool adopting a clamping system using a screw, to effectively apply a clamping force to the cutting insert, a screw receiving portion C' is formed, as shown in FIG. 12, so that the screw 10 is screwed diagonally into the body 1' through a through hole of the cutting insert 2. Here, in a case where the through hole is cylindrical in shape with a constant diameter, even a small displacement between an opening of the through hole at the bottom of the insert and an opening of the screw receiving portion C' on the placement surface 12 may block the proceeding of the screw since the screw 10 contacts the inner wall of the through hole and cannot pass through the placement surface 12 of the insert fixing portion 11. On the other hand, the through hole 26 of the cutting insert 2 of the present embodiment has the major diameter portion 26b at a lower portion, and this makes it possible to adjust the inclination angle of the screw and the position of the tip of the screw and prevent the inner wall of the through hole 26 from blocking the proceeding of the screw 10. Accordingly, the head of the screw 10 accommodated in the minor diameter portion 26a presses the constricted portion 26c so as to clamp the cutting insert 2.

In this manner, the cutting insert 2 of the present embodiment is adaptable to both the clamping system using a screw and the clamping system using a lever.

(Others)

As described above, using the cutting insert 2 together with the body 1, the lever 3, and others allows the cutting insert 2 to be clamped more firmly as compared to the conventional example. This is effective when clamping a cutting insert having a structure with an acute corner having a long distance between the center of a through hole and the corner. However, the present invention is also applicable to the case of clamping a cutting insert having other structures.

The indexable cutting tool of the present invention is not limited to the above-described embodiment. For example, the indexable cutting tool of the present invention is also applicable to general turning tools such as a turning tool for outside diameter machining and a turning tool for inside diameter machining, or milling tools.

Furthermore, the shape of the minor diameter portion 26a which is a first portion of the through hole of the cutting insert and the shape of the major diameter portion 26b which is a second portion of the through hole of the cutting insert are not limited to the above-described cylindrical shape as long as they define a space that can accommodate the screw 10 and the top end portion 31 of the lever, respectively. Their shapes may be, for example, a rectangle. The constricted portion 26c does not need to be formed all around the inner periphery of the through hole 26 as long as it abuts on the head of the screw 10 and can properly receive its pressing force.

In the present embodiment, the screw 4 is loosely inserted into the screw insertion hole 35 provided for the lever 3. It is also possible to form, on the lever itself, a female screw hole through which a screw thread of the screw 4 is threaded. In this case, it does not need to consider a displacement between the central axis of the screw insertion hole and the central axis of the female screw located in a rearward position. Thus, providing a female screw hole can effectively facilitate a clamping operation.

In addition, in the present embodiment, the side wall of the insert fixing portion 11 is provided with three pairs of side wall areas. It is also possible that the side wall is provided with two pairs of side wall areas (for example, the pair of side wall areas 300 and the pair of side wall areas 200 as described above) or four or more pairs of side wall areas. However, the side wall is preferably provided with three pairs of walls as in the present embodiment in terms of machinability or the like.

In the present embodiment, the spring 5 in a coil spring form is used as an elastic member for biasing the lever 3 to the initial position. It is also possible to use another elastic member such as a leaf spring. The pressing member for pressing a lever is not limited to the screw 4 of the present embodiment, and another form can be adopted, such as a mechanism including a spring with a higher spring constant than the spring 5 and is capable of pressing the lever 3 preferably, or a mechanism including a pressing pin.

In addition, the position of the step portion 6 formed inside the space accommodating the lever is not limited to the position described in the present embodiment. It is possible to limit the position of the step portion 6 to a smaller area as long as it serves a purpose of specifying the direction of the lever to be accommodated in a single direction.

Furthermore, although the lever 3 is a rod-shaped member being substantially square pillar in shape in the present embodiment, of course, the lever 3 may be formed in an appropriate shape. In other words, the lever 3 may be, for example, cylindrical or substantially plate-like as long as the lever 3 can achieve the above-described effect. Furthermore, the connecting portion 32b3 protruding from the front surface 32b of the body portion 32 toward the rear end serves as a fulcrum of the lever in the preset embodiment, but the form of the fulcrum is not limited to this. For example, a portion protruding toward the leading end may be provided for the inner wall of the space C in which the lever 3 is arranged so that an abutment point between this portion and the front surface 32b serves as a fulcrum. Alternatively, a protrusion (or a hole) may be provided for two side surfaces connecting the front surface 32b with the back surface 32a of the lever 3, whereas a hole (or a protrusion) is provided for the inner wall of the space C facing the side surfaces, so that the fulcrum is formed by the engagement of the protrusion with the hole.

In addition, the structure of the above-described indexable cutting tool can be used not only in the case of using the cutting insert 2 that is adaptable to the clamping system using a lever and the clamping system using a screw, but also in the case of using a cutting tool that is not assumed to be used for a cutting insert that is adaptable to the clamping system using a screw.

REFERENCE SIGNS LIST

A INDEXABLE CUTTING TOOL
B, C SPACE
C' SCREW RECEIVING PORTION
1, 1' BODY

11 INSERT FIXING PORTION
11a SIDE WALL OF INSERT FIXING PORTION
12 PLACEMENT SURFACE
2 CUTTING INSERT
21 CURVED PORTION (ACUTE CORNER PORTION)
22 TOP SURFACE
23 SIDE SURFACE
24 CUTTING EDGE
25 BOTTOM SURFACE
26 THROUGH HOLE
26a MINOR DIAMETER PORTION
26b MAJOR DIAMETER PORTION
26c CONSTRICTED PORTION
27 RIDGE PORTION
3 LEVER
31 TOP END PORTION
32 BODY PORTION
32a BACK SURFACE
32a1 BACK LOWER PORTION
32a2 BACK UPPER PORTION
32a3 CONNECTING PORTION
32b FRONT SURFACE
32b1 FRONT LOWER PORTION
32b2 FRONT UPPER PORTION
32b3 CONNECTING PORTION
33 BOTTOM END PORTION
33a CUTTING-OUT PORTION
34 CONNECTING PORTION BETWEEN BODY PORTION AND BOTTOM END PORTION
35 SCREW INSERTION HOLE
4 SCREW
5 SPRING
6 STEP PORTION
100 FIRST SIDE WALL AREA
150 CONNECTING PORTION BETWEEN FIRST SIDE WALL AREA AND SECOND SIDE WALL AREA
200 SECOND SIDE WALL AREA
250 CONNECTING PORTION BETWEEN SECOND SIDE WALL AREA AND THIRD SIDE WALL AREA
300 THIRD SIDE WALL AREA

The invention claimed is:

1. A cutting insert used for an indexable cutting tool, the cutting insert comprising:
a through hole (26) formed between a first surface (22) and a second surface (25) that are opposite to each other,
the through hole (26) having:
a first portion defining a first space adjacent to the first surface (22);
a second portion adjacent to the second surface (25) and defining a second space that is larger than the first space; and
a constricted portion (26c) formed between the first portion and the second portion so as to connect the first space to the second space.

2. The cutting insert according to claim 1, the cutting insert being used in a state in which the second surface (25) is placed on an placement surface (12) of the indexable cutting tool (A),
wherein the through hole (26) is configured such that,
in a case where the indexable cutting tool (A) is adapted to clamp using a screw (10), the first portion (26a), the constricted portion (26c), and the second portion (26b) of the through hole (26) allow the screw (10) to be inserted toward a screw receiving portion (C') formed in the placement surface (12) and the first portion (26a) accommodates a head of the screw (10) in the first space, whereas the constricted portion (26c) abuts on the screw (10), and
in a case where the indexable cutting tool (A) is adapted to clamp using a lever (3), the second portion accommodates one end (31) of the lever (3) in the second space.

3. An indexable cutting tool (A) replaceably retaining the cutting insert (2) according to claim 1 and comprising:
a body (1) for holding the cutting insert (2);
a lever (3) having the one end (31) applying a clamping force to the cutting insert (2) from the inside of the second portion (26b) of the through hole (26); and
a pressing member (4) for pressing the lever (3) and causing the lever (3) to be inclined around a fulcrum on the lever (3) so that the clamping force is applied to the lever (3),
wherein the body (1) has an insert fixing portion (11) for placing the cutting insert (2), the insert fixing portion (11) being provided with a placement surface (12) on which the cutting insert (2) is placed and a side wall (11a) formed along the edge of the placement surface (12) and abutting on a side surface (27) of the cutting insert;
wherein the one end (31) of the lever (3) is arranged at a bottom of the insert fixing portion (11) so as to protrude from the placement surface (12) of the insert fixing portion (11) and be accommodated in the second portion (26b); and
wherein a position where a pressing force of the pressing member (4) is applied and a position of the fulcrum are defined such that the lever (3) is inclined in a manner that the one end (31) moves forward in a pressing direction by the pressing member (4).

4. The indexable cutting tool according to claim 3, wherein the lever (3) extends between the one end (31) and the other end (33) that is opposite to the one end (31), and regarding the extending direction, the fulcrum is located closer to the other end (33) away from the one end (31) than the position where the pressing force is applied.

5. The indexable cutting tool according to claim 3, wherein the fulcrum is formed as a portion (32b3) protruding from the lever (3).

6. The indexable cutting tool according to claim 3, further comprising an elastic member (5) that is arranged opposite to the pressing member (4) with respect to the lever (3) and applies to the lever (3) a force opposite in direction to the pressing force that the pressing member (4) applies to the lever (3).

7. The indexable cutting tool according to claim 3, wherein the side wall (11a) of the insert fixing portion (11) is provided with a plurality of pairs of side wall areas (100, 200, 300), the side wall areas in each pair being opposite to each other, so as to accept abutment of an adjacent pair of side surfaces (27) of the cutting insert (2), and an angle defined by the pair of side wall areas gradually decreases from the side wall areas (300) located at the leading end of the body (1).

8. The indexable cutting tool according to claim 7, wherein three pairs of the side wall areas are provided, an angle defined by third side wall areas (300) located closest to the leading end of the body (1) being larger than an angle defined by the adjacent pair of side surfaces (27) of the cutting insert (2), an angle defined by second side wall areas (200) that are connected to the third side wall areas (300) being smaller than the angle defined by the adjacent pair of side surfaces (27) of the cutting insert (2), and an angle defined by first side wall areas (100) that are connected to the second side wall areas (200) being smaller than the angle defined by the second side wall areas (200).

9. The indexable cutting tool according to claim 7, wherein a cutting insert having at least one acute corner (21) formed by the adjacent pair of side surfaces (27) is used as the cutting insert (2).

10. The indexable cutting tool according to claim 9, wherein, as the cutting insert (2), used is a cutting insert being substantially pentagonal in shape and having the acute corner (21), a pair of opposite side surfaces extending from the adjacent pair of side surfaces (27) at an opposite side of the acute corner (21) and being opposite to each other in parallel, and a side surface formed to be square to the pair of opposite side surfaces and on which a cutting edge is formed.

11. The indexable cutting tool according to claim 3, wherein
a cutting-out portion (33*a*) is formed along a part of the periphery of the other end (33) of the lever (3) opposite to the one end (31), and
at a bottom of a space of the body (1) where the lever (3) is arranged, there is formed a step portion (6) that engages the cutting-out portion (33*a*) along a part of the periphery.

12. An indexable cutting tool (A) for retaining a cutting insert (2) in a replaceable manner, the indexable cutting tool (A) comprising:
a body (1) for holding the cutting insert (2);
a lever (3) having one end (31) accommodated in a space provided for the cutting insert (2) and applying a clamping force to the cutting insert (2) from the inside of a portion (26*b*) defining the space; and
a pressing member (4) for pressing the lever (3) and causing the lever (3) to be inclined around a fulcrum on the lever (3) so that the clamping force is applied to the lever (3),
wherein the body (1) has an insert fixing portion (11) for placing the cutting insert (2), and the insert fixing portion (11) being provided with a placement surface (12) on which the cutting insert (2) is placed and a side wall (11*a*) formed along the edge of the placement surface (12) and abutting on a side surface (27) of the cutting insert;
wherein the one end (31) of the lever (3) is arranged at a bottom of the insert fixing portion (11) so as to protrude from the placement surface (12) of the insert fixing portion (11) and be accommodated in the space defined by the portion (26*b*); and
wherein a position where a pressing force of the pressing member (4) is applied and a position of the fulcrum are defined such that the lever (3) is inclined in a manner that the one end (31) moves forward in a pressing direction by the pressing member (4).

13. The indexable cutting tool according to claim 12, wherein the lever (3) extends between the one end (31) and the other end (33) that is opposite to the one end (31), and regarding the extending direction, the fulcrum is located closer to the other end (33) away from the one end (31) than the position where the pressing force is applied.

14. The indexable cutting tool according to claim 13, wherein the fulcrum is formed as a portion (32*b*3) protruding from the lever (3).

15. The indexable cutting tool according to claim 12, further comprising an elastic member (5) that is arranged opposite to the pressing member (4) with respect to the lever (3) and applies to the lever (3) a force opposite in direction to the pressing force that the pressing member (4) applies to the lever (3).

16. The indexable cutting tool according to claim 12, wherein the side wall (11*a*) of the insert fixing portion (11) is provided with a plurality of pairs of side wall areas (100, 200, 300), the side wall areas in each pair being opposite to each other, so as to accept abutment of an adjacent pair of side surfaces (27) of the cutting insert (2), and an angle defined by the pair of side wall areas gradually decreases from the side wall areas (300) located at the leading end of the body (1).

17. The indexable cutting tool according to claim 16, wherein three pairs of the side wall areas are provided, an angle defined by third side wall areas (300) located closest to the leading end of the body (1) being larger than an angle defined by the adjacent pair of side surfaces (27) of the cutting insert (2), an angle defined by second side wall areas (200) that are connected to the third side wall areas (300) being smaller than the angle defined by the adjacent pair of side surfaces (27) of the cutting insert (2), and an angle defined by first side wall areas (100) that are connected to the second side wall areas (200) being smaller than the angle defined by the second side wall areas (200).

18. The indexable cutting tool according to claim 16, wherein a cutting insert having at least one acute corner (21) formed by the adjacent pair of side surfaces (27) is used as the cutting insert (2).

19. The indexable cutting tool according to claim 18, wherein, as the cutting insert (2), used is a cutting insert being substantially pentagonal in shape and having the acute corner (21), a pair of opposite side surfaces extending from the adjacent pair of side surfaces (27) at an opposite side of the acute corner (21) and being opposite to each other in parallel, and a side surface formed to be square to the pair of opposite side surfaces and on which a cutting edge is formed.

20. The indexable cutting tool according to claim 12, wherein
a cutting-out portion (33*a*) is formed along a part of the periphery of the other end (33) of the lever (3) opposite to the one end (31), and
at a bottom of a space of the body (1) where the lever (3) is arranged, there is formed a step portion (6) that engages the cutting-out portion (33*a*) along a part of the periphery.

\* \* \* \* \*